United States Patent
Takei et al.

(10) Patent No.: US 9,332,188 B2
(45) Date of Patent: May 3, 2016

(54) OPTICAL UNIT WITH SHAKE CORRECTING FUNCTION

(75) Inventors: Yuichi Takei, Nagano (JP); Shinji Minamisawa, Nagano (JP); Tatsuki Wade, Nagano (JP); Shinroku Asakawa, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/233,820

(22) PCT Filed: Jul. 3, 2012

(86) PCT No.: PCT/JP2012/066940
§ 371 (c)(1),
(2), (4) Date: Jan. 20, 2014

(87) PCT Pub. No.: WO2013/011829
PCT Pub. Date: Jan. 24, 2013

(65) Prior Publication Data
US 2014/0139693 A1    May 22, 2014

(30) Foreign Application Priority Data
Jul. 21, 2011   (JP) .................. 2011-160350

(51) Int. Cl.
*H04N 5/232*     (2006.01)
*H04N 5/225*     (2006.01)
*G03B 5/00*      (2006.01)

(52) U.S. Cl.
CPC .............. *H04N 5/23287* (2013.01); *G03B 5/00* (2013.01); *H04N 5/2253* (2013.01); *H04N 5/2257* (2013.01); *H04N 5/2328* (2013.01); *H04N 5/23258* (2013.01); *G03B 2205/0023* (2013.01)

(58) Field of Classification Search
CPC ............. H04N 5/2251–5/2254; H04N 5/2257; H04N 5/23248; H04N 5/23287
See application file for complete search history.

(56) References Cited

U.S. PATENT DOCUMENTS

| 8,396,357 B2 * | 3/2013 | Yanagisawa et al. ........... 396/55 |
| 2010/0091120 A1 * | 4/2010 | Nagata et al. .............. 348/208.4 |

(Continued)

FOREIGN PATENT DOCUMENTS

| JP | 2010-096861 A  | 4/2010 |
| JP | 2010-122662 A  | 6/2010 |
| JP | 2011232708 A * | 11/2011 |

OTHER PUBLICATIONS

International Search Report for International Application No. PCT/JP2012/066940, dated Jul. 12, 2013, with English translation.

*Primary Examiner* — Daniel M Pasiewicz
(74) *Attorney, Agent, or Firm* — Cantor Colburn LLP

(57) ABSTRACT

The purpose of the present invention is to provide an optical unit with camera-shake correction function capable of minimizing the load applied to a movable element from a flexible wiring substrate even when the movable element is oscillated, in order to correct camera shake. In an optical unit provided with a camera-shake correction function, a movable element can be oscillated about an oscillation support point by actuating a drive mechanism for camera-shake correction, and camera shake can therefore be corrected. In a flexible wiring substrate drawn out from the movable element, a folded part folded along the rear end portion of the movable element in the optical axis direction is formed in a drawn-out portion from the movable element, and in the optical axis direction, the oscillation support point is positioned between the surface of the folded part that faces the end part on the other side $-Y$ in the Y-axis direction of the rear end portion of the movable element in the optical axis direction, and the surface that faces toward the rear in the optical axis direction at a fixed part of the flexible wiring substrate with respect to a fixed body.

10 Claims, 10 Drawing Sheets

(56) References Cited

U.S. PATENT DOCUMENTS

| | | | |
|---|---|---|---|
| 2010/0098394 A1* | 4/2010 | Ishihara et al. | 396/55 |
| 2011/0097062 A1* | 4/2011 | Tsuruta et al. | 396/55 |
| 2011/0262122 A1* | 10/2011 | Minamisawa et al. | 396/55 |
| 2012/0044368 A1* | 2/2012 | Lin et al. | 348/208.2 |
| 2013/0076924 A1* | 3/2013 | Wade et al. | 348/208.11 |
| 2013/0182325 A1* | 7/2013 | Minamisawa | G03B 5/00 359/554 |

\* cited by examiner

OPTICAL UNIT WITH SHAKE CORRECTING FUNCTION

CROSS REFERENCE TO RELATED APPLICATIONS

This is a U.S. national stage of International Application No. PCT/JP2012/066940, filed on Jul. 3, 2012. Priority under 35 U.S.C. §119(a) and 35 U.S.C. §365(b) is claimed from Japanese Application No. 2011-160350, filed Jul. 21, 2011, the disclosure of which is also incorporated herein by reference.

FIELD OF THE INVENTION

The present invention relates to an optical unit with a shake correcting function which is mounted on a cell phone with a camera or the like.

BACKGROUND

In recent years, a cell phone is structured as an optical device on which an optical unit for photographing is mounted. In the optical unit, in order to restrain disturbance of a photographed image due to a shake of hand of a user, a technique has been proposed in which a movable body provided with optical elements such as a lens and an imaging element is swingably supported by a fixed body, and the movable body is swung based on a detection result of the shake by using an angular velocity sensor, a photo reflector or the like (see Patent Literature 1).

In Patent Literature 1, in order to electrically connect an imaging element with the outside, a structure has been proposed in which a flexible wiring board is connected with a movable body and the flexible wiring board is extended to the outer side from a fixed body. Further, a structure has been proposed in which a flexible wiring board is curved in a "C"-character shape so that, when a movable body is to be swung, the flexible wiring board does not apply a useless load to the movable body.

Japanese Patent Laid-Open No. 2010-96861

However, like a structure described in Patent Literature 1, in a structure that a dimension of a flexible wiring board is set longer by forming the flexible wiring board to be curved in a "C"-character shape for reducing a load which is applied to a movable body from the flexible wiring board, a large space is required to secure on a rear side in an optical axis direction of the movable body. Therefore, a dimension in the optical axis direction of the optical unit is large.

SUMMARY

In view of the problem described above, at least an embodiment of the present invention provides an optical unit with a shake correcting function in which, even when the movable body is swung for correcting a shake, a load applied to the movable body from the flexible wiring board is capable of being restrained small.

In order to attain the above, at least an embodiment of the present invention provides an optical unit with a shake correcting function including a movable body which holds an optical element, a fixed body which covers the movable body, a flexible wiring board which is extended from the movable body to an outer side with respect to the fixed body, a swing support point which is provided between a rear end portion in an optical axis direction of the movable body and the fixed body, and a shake correction drive mechanism which swings the movable body with the swing support point as a swing center. The flexible wiring board is provided with a bent part, which is bent along the rear end portion in the optical axis direction of the movable body in a lead-out portion from the movable body, and a fixed part which is fixed to the fixed body in an extended portion from the fixed body to the outer side, and the swing support point is located in the optical axis direction between a face of the bent part facing the rear end portion in the optical axis direction of the movable body and a face of the fixed part which faces a rear side in the optical axis direction.

In at least an embodiment of the present invention, the optical unit with a shake correcting function is provided with a shake correction drive mechanism structured to swing the movable body and thus, when a shake such as a shake of hand is occurred in the optical unit, the movable body can be swung to cancel the shake. Therefore, even when the optical unit is shaken, the inclination of the optical axis can be corrected. Further, a flexible wiring board is extended from the movable body and the flexible wiring board is provided with a bent part. The bent part is structured so as to be bent along the rear end portion in the optical axis direction of the movable body in a lead-out portion from the movable body. Therefore, different from a case that the flexible wiring board is curved in a "C"-character shape, the flexible wiring board is not curved largely and thus a narrow space is sufficient for disposing and extending the flexible wiring board on the rear side in the optical axis direction of the movable body. Further, the bent part is structured so that the lead-out portion from the movable body is bent along the rear end portion in the optical axis direction of the movable body, and the flexible wiring board is provided with the fixed part which is fixed to the fixed body in the extended portion from the fixed body to the outer side. Therefore, the flexible wiring board is capable of being displaced only in the portion from the bent part to the fixed part. However, in at least an embodiment of the present invention, the swing support point is located in the optical axis direction between a face of the bent part, which faces the rear end portion in the optical axis direction of the movable body, and a face of the fixed part which faces the rear side in the optical axis direction and thus, even when the movable body is swung, displacement of the flexible wiring board is small. Accordingly, when the movable body is swung, a load which is applied to the movable body by the flexible wiring board is small.

In at least an embodiment of the present invention, it is preferable that the flexible wiring board is provided with branched parts, which are divided so as to pass through on both sides of the swing support point, between the bent part and the fixed part. According to this structure, when the movable body is swung, a load which is applied to the movable body by the flexible wiring board is small and thus, the movable body can be swung appropriately.

In at least an embodiment of the present invention, it is preferable that the branched parts are ended before the fixed part viewed from a side where the swing support point is located. According to this structure, different from a case that the branched parts are utilized as the fixed part, a difference of the length dimension of the branched parts does not occur. Therefore, the branched parts do not apply an unnecessary load to the movable body.

In at least an embodiment of the present invention, it may be structured that the flexible wiring board is bent only through the bent part between a connected part with the movable body and the fixed part, and a portion between the bent part and the fixed part is extended so as to obliquely intersect the optical axis direction.

In at least an embodiment of the present invention, it may be structured that the flexible wiring board is bent only through the bent part between a connected part with the movable body and the fixed part, and a portion between the bent part and the fixed part is extended so as to be perpendicular to the optical axis direction.

In at least an embodiment of the present invention, it is preferable that the movable body includes a rigid plate on the rear end portion in the optical axis direction and the rigid plate is supported by the fixed body through the swing support point. According to this structure, even when an impact is applied to the movable body through the swing support point, the movable body can be prevented from being damaged.

In at least an embodiment of the present invention, it may be structured that an imaging element is provided on a front side with respect to the rigid plate in the optical axis direction. According to this structure, even when an impact is applied to the movable body through the swing support point, the imaging element can be protected.

In at least an embodiment of the present invention, it may be structured that the bent part is fixed to a face of the rigid plate on a rear side in the optical axis direction with an adhesive.

In at least an embodiment of the present invention, it is preferable that a region of the rigid plate where the flexible wiring board is bonded is formed by a stepped part which is protruded from its surrounding area, and the region is formed with a groove-shaped recessed part. According to this structure, even when an impact is applied to the movable body through the swing support point, the flexible wiring board can be prevented from being detached from the movable body.

In this case, it is preferable that the flexible wiring board is fixed to the rigid plate with an adhesive, and a region of the rigid plate where the flexible wiring board is bonded is formed by a stepped part which is protruded from its surrounding area, and the region is formed with a groove-shaped recessed part. According to this structure, since the groove-shaped recessed part functions as a reservoir part for the adhesive, the flexible wiring board and the rigid plate can be surely bonded to each other. Further, the region of the rigid plate where the flexible wiring board is bonded is formed by a stepped part which is protruded from its surrounding area and thus, the flexible wiring board can be bonded at a predetermined position.

In at least an embodiment of the present invention, it is preferable that corner portions on both sides in a widthwise direction of the bent part are formed to be cut off in an inclined shape or an "R"-shape, and corner portions on both sides in a widthwise direction of an end part of the rigid plate on an opposite side to the bent part are formed to be cut off in an inclined shape or an "R"-shape. According to this structure, when the movable body is to be swung, a corner edge of the bent part of the flexible wiring board and a corner edge of the rigid plate can be prevented from contacting with the fixed body and thus, a swing range of the movable body can be increased.

In at least an embodiment of the present invention, the optical unit with a shake correcting function is provided with a shake correction drive mechanism structured to swing the movable body and thus, when a shake such as a shake of hand is occurred in the optical unit, the movable body can be swung to cancel the shake. Therefore, even when the optical unit is shaken, an inclination of the optical axis can be corrected. Further, the flexible wiring board is extended from the movable body and the flexible wiring board is provided with a bent part. The bent part is structured so as to be bent along the rear end portion in the optical axis direction of the movable body in a lead-out portion from the movable body. Therefore, different from a case that the flexible wiring board is curved in a "C"-character shape, the flexible wiring board is not curved largely and thus a narrow space is sufficient for disposing and extending the flexible wiring board on the rear side in the optical axis direction of the movable body. Further, the bent part is structured so that the lead-out portion from the movable body is bent along the rear end portion in the optical axis direction of the movable body, and the flexible wiring board is provided with the fixed part which is fixed to the fixed body in the extended portion from the fixed body to the outer side. Therefore, the flexible wiring board is capable of being displaced only in the portion from the bent part to the fixed part. However, in at least an embodiment of the present invention, the swing support point is located in the optical axis direction between a face of the bent part, which faces the rear end portion in the optical axis direction of the movable body and a face of the fixed part which faces the rear side in the optical axis direction and thus, even when the movable body is swung, displacement of the flexible wiring board is small. Accordingly, when the movable body is swung, a load which is applied to the movable body by the flexible wiring board is small and thus the movable body can be swung appropriately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings. In the following description, a structure for preventing a hand shake to a photographing unit will be described below as an example for an optical unit. Further, in the following description, three directions perpendicular to each other are set to be an "X"-axis, a "Y"-axis and a "Z"-axis and a direction (optical axis direction "L") along an optical axis (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side/rear side in the optical axis direction "L") of the "Z"-axis, and "−Z" is indicated on the other side (object side/front side in the optical axis direction "L").

First Embodiment

Entire Structure of Optical Unit

Figure 1:
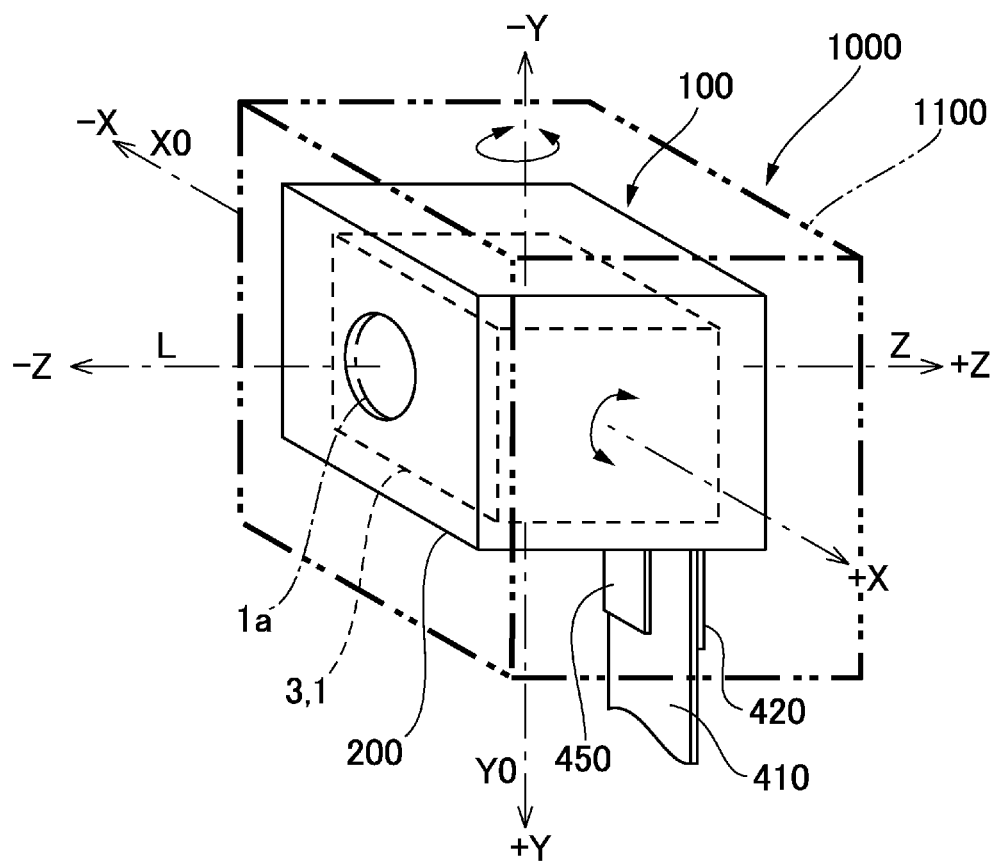
FIG. 1 is an explanatory view schematically showing a state in which an optical unit with a shake correcting function in accordance with at least an embodiment of the present invention is mounted on an optical device such as a cell phone.
Figure 2:
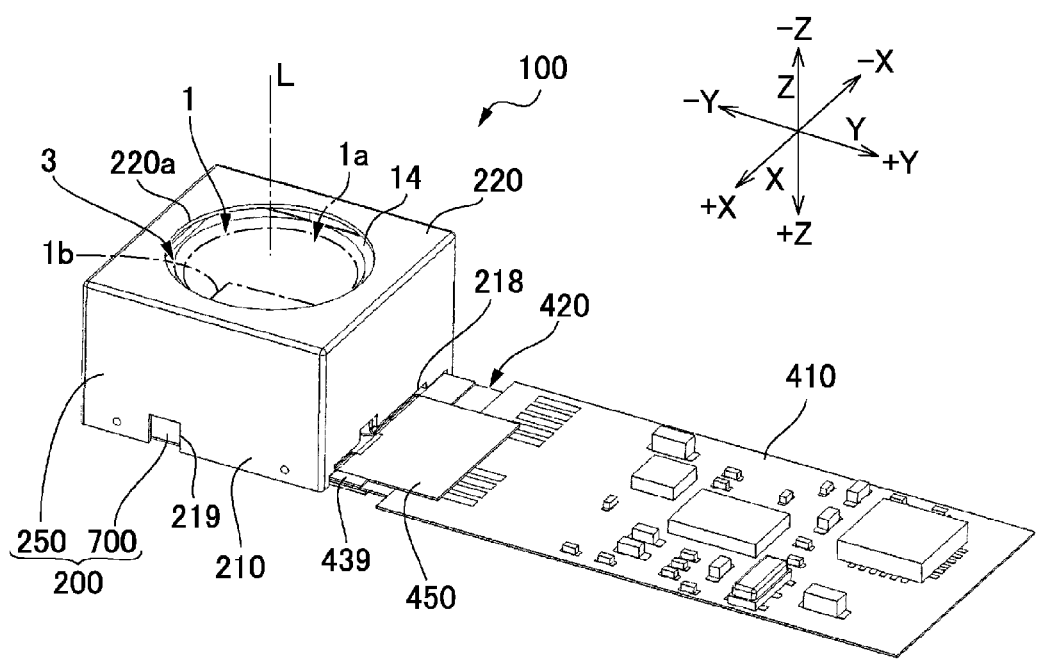
FIG. 2 is a perspective view showing an entire structure of an optical unit with a shake correcting function in accordance with a first embodiment of the present invention.
Figure 3A:
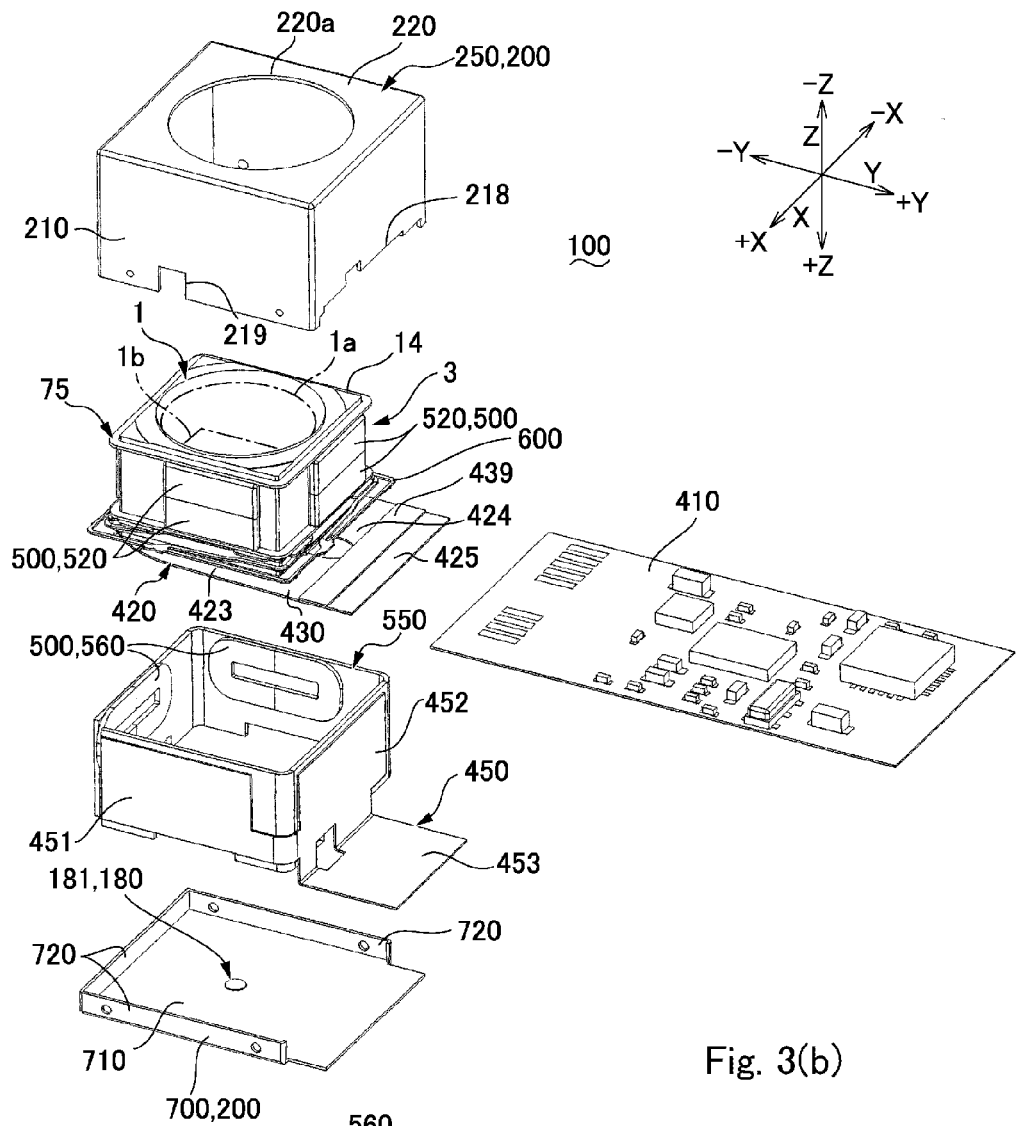
FIG. 3(a) is an exploded perspective view showing an optical unit with a shake correcting function in accordance with a first embodiment of the present invention.

FIG. 1 is an explanatory view schematically showing a state in which an optical unit with a shake correcting function in accordance with at least an embodiment of the present invention is mounted on an optical device such as a cell phone. FIG. 2 is a perspective view showing an entire structure of an optical unit with a shake correcting function in accordance with a first embodiment of the present invention. FIG. 3(a) is an exploded perspective view showing an optical unit with a shake correcting function in accordance with the first embodiment of the present invention, and FIG. 3(b) is an exploded perspective view showing a flexible wiring board on a fixed body side.

An optical unit 100 (optical unit with a shake correcting function) shown in FIG. 1 is a thin camera used in an optical device 1000 such as a cell phone with a camera and is mounted in a supported state by a chassis 1100 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable body 3 including a photographing unit 1 is supported within a fixed body 200 so as to be capable of being swung and the optical unit 100 is provided with a shake correction drive mechanism (not shown in FIG. 1) which swings the movable body 3 on the basis of a detection result for a hand shake by a shake detection sensor such as a gyroscope (not shown) mounted on the optical unit 100 or a gyroscope (not shown) mounted on a main body side of the optical device 1000.

Figure 3B:
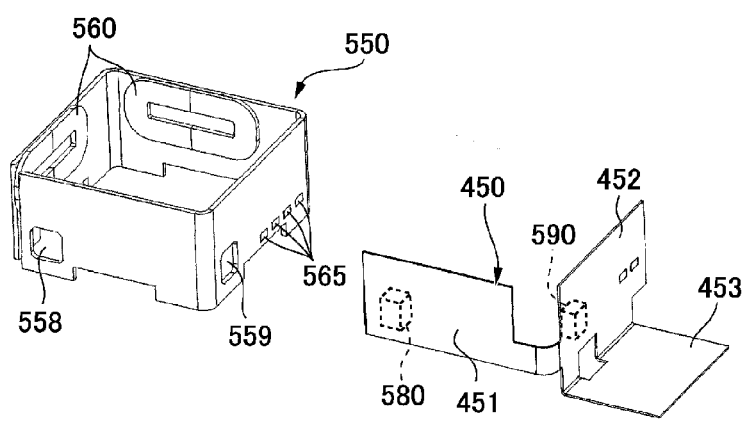
FIG. 3(b) is an exploded perspective view showing a flexible wiring board on a fixed body side.

As shown in FIG. 2 and FIGS. 3(a) and 3(b), flexible wiring boards 420 and 450 are extended from the optical unit 100 for supplying power to the photographing unit 1 and the shake correction drive mechanism. The flexible wiring boards 420 and 450 are connected with a flexible wiring board 410. In this embodiment, the flexible wiring board 420 is provided with a function for outputting a signal from the photographing unit 1 and the like. Therefore, the flexible wiring board 420 is connected with the movable body 3.

In the movable body 3, the photographing unit 1 includes a case 14 in a rectangular box shape which is made of a ferromagnetic plate such as a steel plate. A holder 12 which holds a lens 1a, a sleeve 13 in a cylindrical tube shape which holds the holder 12, a lens drive mechanism for driving the lens 1a in a focusing direction, an imaging element 1b which is disposed on a rear side in the optical axis direction "L", an element holder which holds the imaging element 1b and the like are provided on an inner side of the case 14. An outer peripheral portion of the photographing unit 1 is structured of the case 14. In this embodiment, a side face of the case 14 is utilized as a reflection face for a photo reflector (a first photo reflector 580 and a second photo reflector 590) described below. Therefore, the case 14 is made of a metal member having high reflectivity.

In FIGS. 3(a) and 3(b), the optical unit 100 includes the fixed body 200, the movable body 3 provided with the photographing unit 1, a swing support point 180 for setting the movable body 3 in a state so as to be capable of being displaced with respect to the fixed body 200, and a shake correction drive mechanism 500 for generating a magnetic drive force between the movable body 3 and the fixed body 200 by which the movable body 3 is relatively displaced with respect to the fixed body 200. Further, the optical unit 100 includes a spring member 600 which urges the movable body 3 toward the swing support point 180.

The fixed body 200 is provided with an upper cover 250, a lower cover 700 and the like, and the upper cover 250 is provided with a rectangular tube-shaped body part 210 which surrounds the movable body 3 and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis is extended) of the rectangular tube-shaped body part 210 is formed to be opened. Further, two side faces facing in the "X" direction of the rectangular tube-shaped body part 210 are formed with a cut-out portion 219 and two side faces facing in the "Y" direction are formed with a cut-out portion 218. The cut-out portion 218 located on the one side "+Y" in the "Y"-axis direction is utilized for extending the flexible wiring board 420 and the like to the outer side, and other cut-out portions 218 and 219 are utilized for joining the upper cover 250 to the lower cover 700 by adhesion, welding or the like.

The lower cover 700 is a press-worked product which is made of a metal plate and the lower cover 700 is provided with a substantially rectangular bottom plate part 710 and three side plate parts 720 which are stood up from an outer circumferential edge of the bottom plate part 710 toward the object side. A side which is not formed with the side plate part 720 is utilized for extending the flexible wiring board 410 and the like to the outer side. The bottom plate part 710 of the lower cover 700 is formed with a pivot 181 which structures a swing support point 180 at its center position. The pivot 181 swingably supports the movable body 3 by abutting with a rear side end part in an optical axis direction "L" of the movable body 3. In this embodiment, the pivot 181 is held by a hole 717 (see FIGS. 6(a) and 6(b)) which is formed at a center position of the bottom plate part 710. In this embodiment, a rear side end part in the optical axis direction "L" of the movable body 3 is formed of a rigid plate 30 described below and the pivot 181 is abutted with the rigid plate 30.

(Structure of Movable Body 3)

Figure 4A:
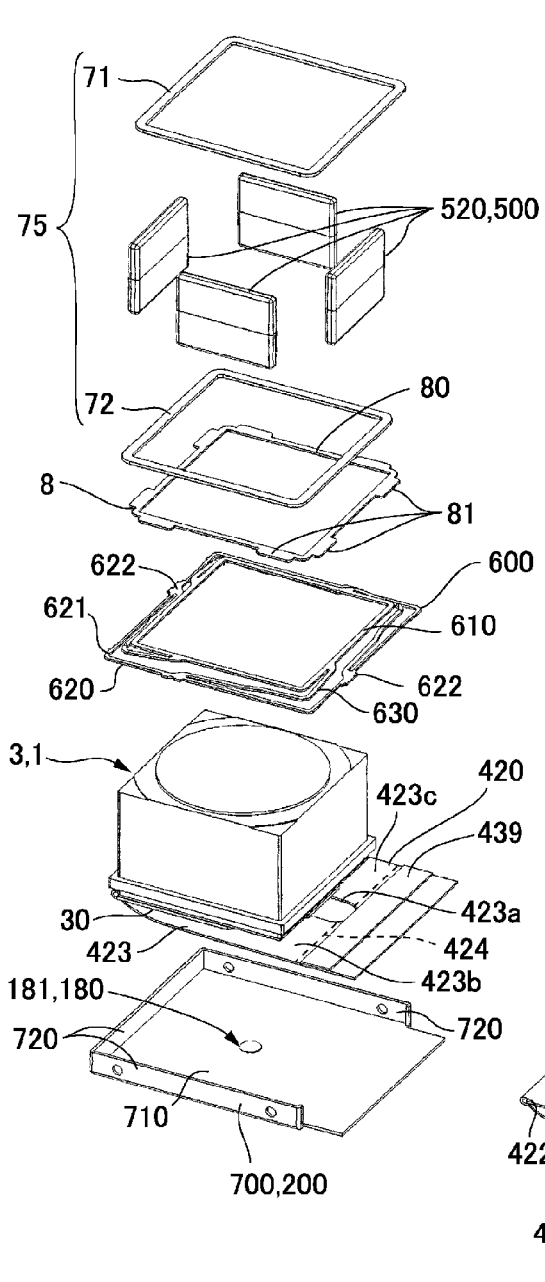
FIGS. 4(a) and 4(b) are explanatory views showing a movable body and the like of an optical unit with a shake correcting function in accordance with a first embodiment of the present invention.
Figure 4A:
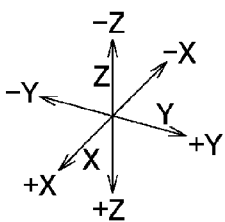
Figure 4B:
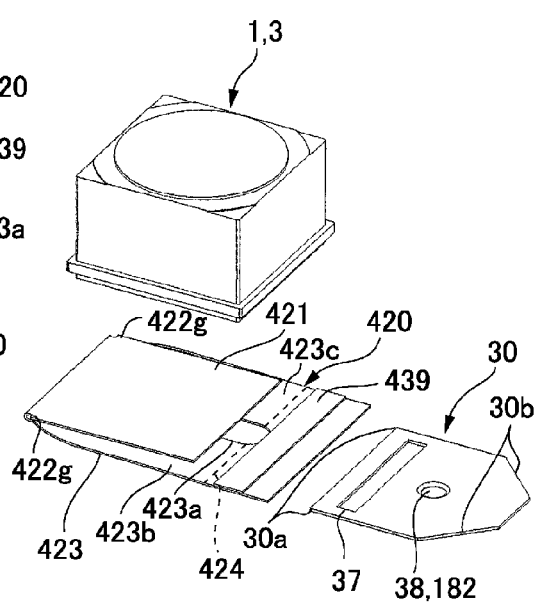

FIGS. 4(a) and 4(b) are explanatory views showing the movable body 3 and the like of the optical unit 100 with a shake correcting function in accordance with the first embodiment of the present invention. FIG. 4(a) is an exploded perspective view showing the movable body 3 and the like, and FIG. 4(b) is an explanatory view showing the flexible wiring board 420 and the like on the movable body 3 side. In FIGS. 4(a) and 4(b), a lens holder and the like in an inside of the photographing unit 1 are not shown.

As shown in FIGS. 3(a) and 3(b) and FIGS. 4(a) and 4(b), the movable body 3 includes a photographing unit 1, a first rectangular frame-shaped holder 71, a second rectangular frame-shaped holder 72 and a stopper member 8. The stopper member 8 is fixed to a face on a rear side in the optical axis direction "L" of the second holder 72 by a method such as welding. In this embodiment, flat plate-shaped permanent magnets 520 which are used in the shake correction drive mechanism 500 are held between the first holder 71 and the second holder 72. Specifically, the first holder 71 is fixed to front side faces in the optical axis direction "L" of the permanent magnets 520 and the second holder 72 is fixed to rear side faces in the optical axis direction "L" of the permanent magnets 520. The permanent magnets 520, the first holder 71 and the second holder 72 structure a permanent magnet assembly 75 in a rectangular tube shape. Therefore, after the photographing unit 1 is inserted into an inner side of the rectangular tube-shaped permanent magnet assembly 75, an outer peripheral face of the case 14 of the photographing unit 1 and the inner peripheral face of the permanent magnet assembly 75 (inner faces of the permanent magnets 520) are fixed to each other by an adhesive or the like and, as a result, the permanent magnets 520, the first holder 71, the second holder 72, the stopper member 8 and the photographing unit 1 are integrated with each other to structure the movable body 3.

(Structure of Spring Member 600)

The spring member 600 is a plate-shaped spring member which is provided with a fixed side connecting part 620 in a rectangular frame shape which is connected with the fixed body 200, a movable side connecting part 610 which is connected with the movable body 3, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the fixed side connecting part 620 is provided with a main body portion 621 in a rectangular frame shape and protruded parts 622 which are protruded to outer sides at middle positions of side portions of the main body portion 621.

In order to connect the spring member 600 with the movable body 3 and the fixed body 200, in this embodiment, the movable side connecting part 610 is fixed to the rear side end face in the optical axis direction "L" of the stopper member 8 by a method such as welding. Further, the fixed side connecting part 620 is fixed to upper end parts of the side plate parts 720 of the lower cover 700 by a method such as welding in a state that the protruded parts 622 are fitted to the cut-out portions 218 and 219 of the upper cover 250. The spring member 600 is made of nonmagnetic metal such as beryllium copper or nonmagnetic SUS steel material and is formed by performing press working or etching processing using a photo lithography technique on a thin plate having a certain thickness.

In this embodiment, when the movable side connecting part 610 of the spring member 600 is connected with the movable body 3 and the fixed side connecting part 620 is fixed to the fixed body 200, the movable body 3 is set in a pushed-up state to the front side in the optical axis direction "L" by the swing support point 180. Therefore, the movable side connecting part 610 of the spring member 600 is in a pushed-up state to the front side in the optical axis direction "L" with respect to the fixed side connecting part 620 and thus the arm parts 630 of the spring member 600 urges the movable body 3 to the rear side in the optical axis direction "L". Accordingly, the movable body 3 is in a state urged toward the swing support point 180 by the spring member 600 and the movable body 3 is in a supported state by the fixed body 200 so as to be capable of swinging through the swing support point 180.

(Structure of Shake Correction Drive Mechanism)

Figure 5A:
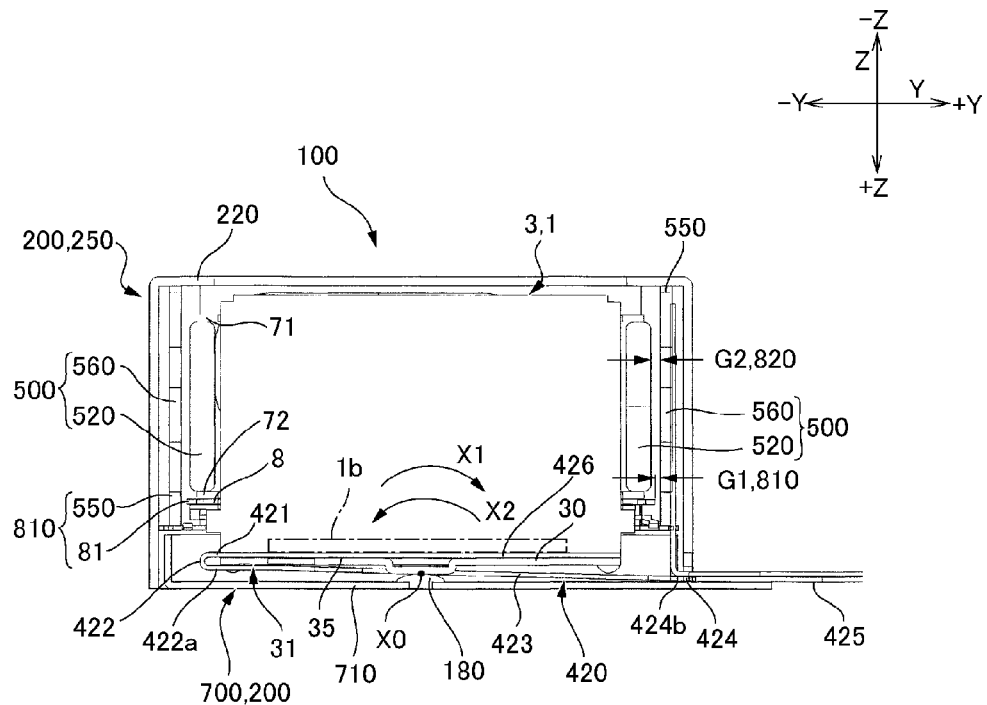
FIGS. 5(a) and 5(b) are cross-sectional views showing an optical unit with a shake correcting function in accordance with a first embodiment of the present invention.
Figure 5B:
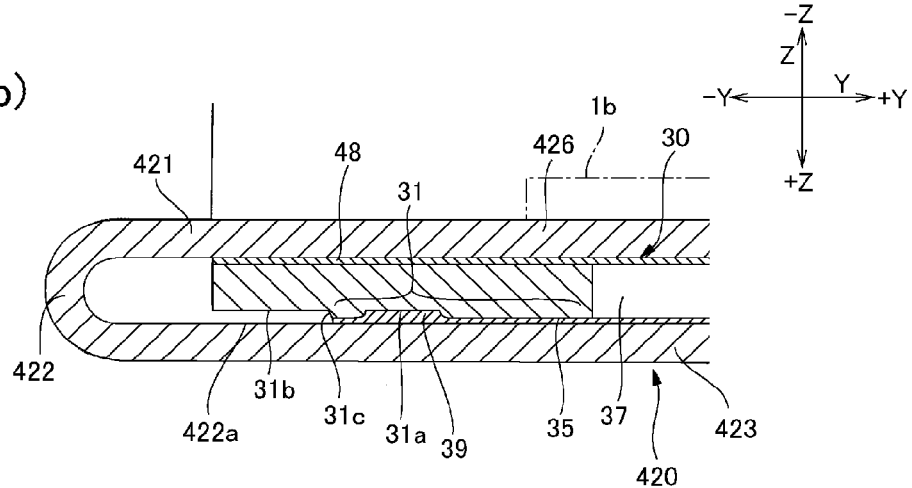

FIGS. 5(a) and 5(b) are cross-sectional views showing the optical unit 100 with a shake correcting function in accordance with the first embodiment of the present invention. FIG. 5(a) is a "YZ" cross-sectional view showing the optical unit 100 and FIG. 5(b) is an enlarged cross-sectional view showing a bent portion of the flexible wiring board 420. In FIGS. 5(a) and 5(b), a lens holder and the like in an inside of the photographing unit are not shown.

As shown in FIGS. 3(a) and 3(b), FIGS. 4(a) and 4(b), and FIGS. 5(a) and 5(b), in the optical unit 100 in this embodiment, the shake correction drive mechanism 500 is structured of coil parts 560 and the permanent magnets 520 which generate magnetic fields interlinking with the coil parts 560. Specifically, the flat plate-shaped permanent magnet 520 is fixed to each of four outer faces of the case 14 in the movable body 3 and the coil part 560 is disposed on an inner face of the rectangular tube-shaped body part 210 of the upper cover 250 (fixed body 200). The outer face side and the inner face side of the permanent magnet 520 are magnetized in different poles from each other. Further, the permanent magnet 520 is comprised of two magnet pieces which are disposed in the optical axis direction "L" and the faces of the magnet pieces facing the coil part 560 are magnetized in different poles from each other in the optical axis direction "L". Further, the coil part 560 is formed in a substantially quadrangular frame shape and its upper and lower long side portions are utilized as an effective side.

The permanent magnet 520 and the coil part 560 which are disposed at two positions interposing the movable body 3 on both sides in the "Y"-axis direction structure a "Y"-side shake correction drive mechanism and, as shown by the arrows "X1" and "X2" in FIG. 5(a), the "Y"-side shake correction drive mechanism swings the movable body 3 with an axial line "X0" passing through the swing support point 180 and extending in the "X"-axis direction as a swing center. Further, the permanent magnet 520 and the coil part 560 which are disposed at two positions interposing the photographing unit 1 on both sides in the "X"-axis direction structure an "X"-side shake correction drive mechanism and the "X"-side shake correction drive mechanism swings the movable body 3 with an axial line passing through the swing support point 180 and extending in the "Y"-axis direction as a swing center.

In order to structure the shake correction drive mechanism 500 ("Y"-side shake correction drive mechanism and "X"-side shake correction drive mechanism), in this embodiment, a sheet-shaped coil body 550 is used which is extended along four inner faces of the upper cover 250. In the sheet-shaped coil body 550, four coil parts 560 are integrally formed with each other at a predetermined interval. Further, when the sheet-shaped coil body 550 is developed, the sheet-shaped coil body 550 is provided with a shape extending in a belt shape and is fixed to the inner face of the upper cover 250 by a method such as surface bonding in a state that the sheet-shaped coil body 550 is bent so as to be along the four inner faces of the upper cover 250.

The sheet-shaped coil body 550 is structured so that the coil part 560 made of a minute copper wiring line is formed on a printed circuit board by utilizing an electric conduction wiring technique. A plurality of copper wiring layers (coil part 560) is formed in multi-layer through an insulation film. Further, the surface of the copper wiring line (coil part 560) is covered with an insulation film. For example, an FP coil (fine pattern coil (registered mark)) made by ASAHI KASEI ELECTRONICS CO., LTD. may be used as the sheet-shaped coil body 550.

As shown in FIG. 3(*b*), a plurality of terminal parts 565 is formed on one of four faces of the sheet-shaped coil body 550 bent in a rectangular shape by an electrically conducting layer extended from four coil parts 560. In this embodiment, the terminal parts 565 are disposed on an outer side of the sheet-shaped coil body 550 which is opposite to the inner side facing the permanent magnet 520. The terminal parts 565 are electrically connected with the flexible wiring board 450 disposed so as to superpose on the sheet-shaped coil body 550 from the outer side and electrical power is supplied through the flexible wiring board 450.

In this embodiment, as described above, since the sheet-shaped coil body 550 is used, in comparison with a case that discrete air-core coils are separately used, a space between the photographing unit 1 and the fixed body 200 can be narrowed. Therefore, the size of the optical unit 100 can be made small. Further, in the case of the sheet-shaped coil body 550, since a plurality of the coil parts 560 is integrally provided with the terminal parts 565, even when a plurality of coil parts 560 are required to be disposed around the optical axis, the sheet-shaped coil body 550 can be extended around the optical axis. Therefore, different from a case that discrete air-core coils are separately used, discrete air-core coils are not required to be disposed at plural positions around the optical axis and discrete air-core coils are not required to be electrically connected and thus, according to this embodiment, assembly man-hours are reduced. Further, the terminal parts 565 of the sheet-shaped coil body 550 are disposed on the outer side which is an opposite side to the permanent magnet 520 and thus electrical connection with the coil parts 560, in other words, connection of the flexible circuit board 450 with the terminal parts 565 can be performed easily.

The flexible wiring board 450 is provided with a first portion 451 and a second portion 452 which are perpendicularly bent so as to superpose on a face on one side, i.e., the "+X" side in the "X"-axis direction of the sheet-shaped coil body 550 and a face on one side, i.e., the "+Y" side in the "Y"-axis direction from the outer side. An end part 453 which is bent at a rear side end part in the optical axis direction "L" of the second portion 452 is connected with the flexible wiring board 410 on an outer side.

In this embodiment, portions of the sheet-shaped coil body 550 which are superposed on the first portion 451 and the second portion 452 of the flexible wiring board 450 are formed with rectangular windows 558 and 559. Further, a first photo reflector 580 and a second photo reflector 590 are mounted on faces on the inner sides of the first portion 451 and the second portion 452 of the flexible wiring board 450 at positions superposed on the windows 558 and 559. The first photo reflector 580 and the second photo reflector 590 are located in insides of the windows 558 and 559 of the sheet-shaped coil body 550. Therefore, when the optical unit 100 is assembled, a light emitting part and a light receiving part of the first photo reflector 580 face a side face of the movable body 3 (side face of the case 14) in the "X"-axis direction, and a light emitting part and a light receiving part of the second photo reflector 590 face a side face of the movable body 3 (side face of the case 14) in the "Y"-axis direction.

(Structure of Stopper Mechanism)

In the optical unit 100 in this embodiment, the movable body 3 is supported by the fixed body 200 in a state that the movable body 3 is capable of swinging through the swing support point 180. Therefore, when a large force is applied from the outside to displace the movable body 3 largely, the arm parts 630 of the spring member 600 may be plastically deformed. In order to prevent this problem, in this embodiment, a stopper mechanism which will be described below is provided.

In this embodiment, as described with reference to FIGS. 4(*a*) and 4(*b*) and FIGS. 5(*a*) and 5(*b*), the stopper member 8 in a rectangular frame shape is fixed to the rear side end face in the optical axis direction "L" of the second holder 72 of the movable body 3 by a method such as welding. The stopper member 8 is provided with a main body portion 80 in a rectangular frame shape and protruded parts 81 which are protruded from the main body portion 80 toward the outer side. The protruded parts 81 protrude to outer sides with respect to the permanent magnets 520. In this embodiment, the protruded part 81 is formed in each of four side portions of the main body portion 80. Further, the protruded part 81 is provided in each of four side portions of the main body portion 80 at two positions separated in an extended direction of the side portion. In this embodiment, the protruded part 81 is provided in the vicinity of both ends of four side portions of the main body portion 80 (near the corner of the main body portion 80).

The protruded part 81 faces the lower end portion of the sheet-shaped coil body 550 provided on the fixed body 200 through a narrow gap space "G1" (see FIG. 5(*a*)) on both sides in the "X"-axis direction and on both sides in the "Y"-axis direction. Therefore, the protruded parts 81 and the sheet-shaped coil body 550 structure a stopper mechanism 810 between the shake correction drive mechanism 500 and the swing support point 180 in the optical axis direction "L" for determining a movable range when the movable body 3 is displaced in a direction perpendicular to the optical axis direction "L". More specifically, the protruded parts 81 and the sheet-shaped coil body 550 structure the stopper mechanism 810 between the shake correction drive mechanism 500 and the spring member 600 in a space between the shake correction drive mechanism 500 and the swing support point 180 in the optical axis direction "L" for determining a movable range when the movable body 3 is displaced in the direction perpendicular to the optical axis direction "L".

In a case of the sheet-shaped coil body 550, different from an air-core coil, a wound coil is not loosened even when the coil is abutted with the permanent magnet 520. Therefore, a portion with which the protruded part 81 is abutted may be either of a portion of the sheet-shaped coil body 550 where the coil part 560 is structured and a portion where the coil part 560 is not structured. However, in this embodiment, a portion with which the protruded part 81 is abutted is set to be a portion of the sheet-shaped coil body 550 where the coil part 560 is not structured.

Further, the sheet-shaped coil body 550 and the permanent magnet 520 are oppositely disposed to each other through a narrow gap space "G2" and the gap space "G2" is a slightly larger than the gap space "G1" between the protruded part 81 and the sheet-shaped coil body 550. Therefore, the sheet-shaped coil body 550 and the permanent magnets 520 structure a stopper mechanism 820 which determines a swing range when the movable body 3 is swung. A portion of the sheet-shaped coil body 550 with which the permanent magnets 520 is abutted may be either of a portion where the coil part 560 is structured and a portion where the coil part 560 is not structured. However, in this embodiment, a portion of the sheet-shaped coil body 550 with which the permanent magnets 520 are abutted is set to be a portion where the coil part 560 is structured. According to the stopper mechanism 820, a swing range of the movable body 3 can be set with a high degree of accuracy. In other words, in the shake correction drive mechanism 500, a distance between the sheet-shaped coil body 550 and the permanent magnet 520 is set with a high degree of accuracy and thus, when the stopper mechanism 820 is structured by utilizing the sheet-shaped coil body 550 and the permanent magnet 520, a swing range of the movable body 3 is set with a high degree of accuracy.

As described above, in this embodiment, the protruded part 81 protruded from one of the fixed body 200 and the movable body 3 is capable of being abutted with the other of the fixed body 200 and the movable body 3 and, in this manner, the stopper mechanism 810 is provided for determining the movable range when the movable body 3 is displaced in the direction perpendicular to the optical axis direction "L". Specifically, in this embodiment, the stopper mechanism 810 is provided for determining the movable range when the movable body 3 is displaced in the direction perpendicular to the optical axis direction "L" by abutting the protruded part 81 protruded from the movable body 3 with the fixed body 200 side. Therefore, even when an impact is applied to the movable body 3 to displace the movable body 3 in the direction perpendicular to the optical axis direction "L", the movable range of the movable body 3 is restricted. Accordingly, the spring member 600 is prevented from being plastically deformed and being damaged. Further, the protruded part 81 (stopper mechanism 810) is provided between the shake correction drive mechanism 500 and the swing support point 180 in the optical axis direction "L". Therefore, the stopper mechanism 810 is operated with a little displaced amount of the movable body 3 and thus the plastic deformation of the spring member 600 is prevented surely. Further, the protruded part 81 (stopper mechanism 810) is provided between the shake correction drive mechanism 500 and the spring member 600 in the optical axis direction "L". Therefore, the movable range when the movable body 3 is displaced in the direction perpendicular to the optical axis direction "L" is restricted further narrow and thus the plastic deformation of the spring member 600 is prevented further surely.

Further, the protruded part 81 is protruded from the movable body 3 to the sheet-shaped coil body 550 side with respect to the permanent magnet 520 so as to be abutted with the sheet-shaped coil body 550. Therefore, the movable range when the movable body 3 is displaced in the direction perpendicular to the optical axis direction "L" can be set with a high degree of accuracy and thus the movable range when the movable body 3 is displaced in the direction perpendicular to the optical axis direction "L" is restricted without disturbing the swing of the movable body 3. In other words, in the shake correction drive mechanism 500, a distance between the sheet-shaped coil body 550 and the permanent magnet 520 is set with a high degree of accuracy and thus, when it is structured so that the protruded part 81 is abutted with the sheet-shaped coil body 550, a distance between the protruded part 81 and the sheet-shaped coil body 550 is also set with a high degree of accuracy. Accordingly, the movable range when the movable body 3 is displaced in the direction perpendicular to the optical axis direction "L" is set with a high degree of accuracy. Further, the protruded part 81 is provided at two positions separated from each other in each of four side portions of a quadrangular shape. Therefore, when the stopper mechanism 810 is operated, since a force in the twisting direction is not applied to the movable body 3, the spring member 600 is prevented from being plastically deformed in the twisting direction.

(Shake Correcting Operation)

In the optical unit 100 in this embodiment, when the optical device 1000 shown in FIG. 1 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible wiring board 410 and the flexible wiring board 450. As a result, the shake correction drive mechanism 500 swings the photographing unit 1 around the "Y"-axis with the swing support point 180 as a swing center. Further, the shake correction drive mechanism 500 swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "X-Y" plane. Accordingly, all shakes occurred in the optical unit 100 can be corrected surely.

When the photographing unit 1 is to be driven, the displacement of the photographing unit 1 is monitored by the first photo reflector 580 and the second photo reflector 590 shown in FIG. 3(b). In other words, a distance variation to the movable body 3 is obtained on the basis of a detection result by the first photo reflector 580 when the movable body 3 is driven by the shake correction drive mechanism 500 and is turned around the axial line extended in the "Y"-axis direction passing through the swing support point 180, and thus displacement in the "X"-axis direction of the movable body 3 can be monitored. Further, a distance variation to the movable body 3 is obtained on the basis of a detection result by the second photo reflector 590 when the movable body 3 is driven by the shake correction drive mechanism 500 and is turned around the axial line extended in the "X"-axis direction passing through the swing support point 180, and thus displacement in the "Y"-axis direction of the movable body 3 can be monitored. Therefore, displacements of the movable body 3 when turned around the axial lines can be monitored and thus turnings of the movable body 3 around the axial lines can be controlled.

(Structure of Flexible Wiring Board 420 and Rigid Plate 30)

Figure 6A:
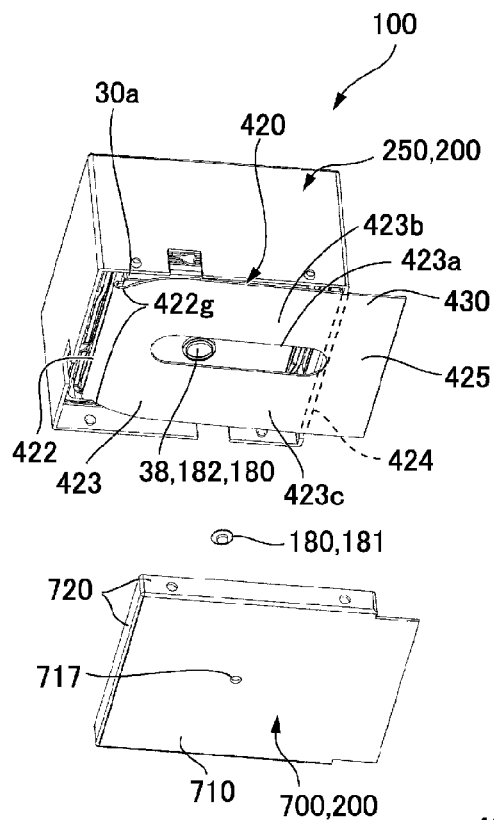
FIGS. 6(a) and 6(b) are perspective views showing an optical unit with a shake correcting function in accordance with a first embodiment of the present invention which is viewed from a rear side in an optical axis direction.
Figure 6B:
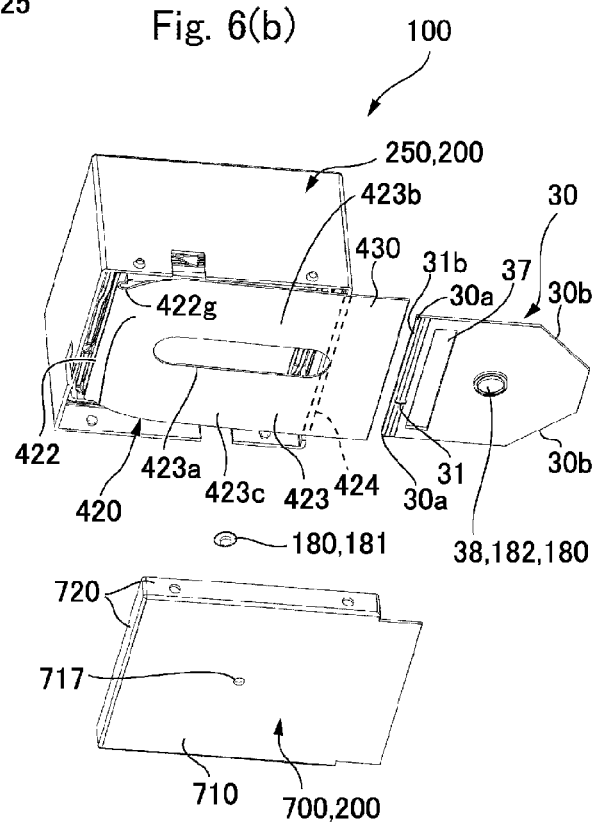

FIGS. 6(a) and 6(b) are perspective views showing the optical unit 100 with a shake correcting function in accordance with the first embodiment of the present invention which is viewed from the rear side in the optical axis direction "L". FIG. 6(a) is an exploded perspective view showing a state that the lower cover 700 is detached from the optical unit 100 with a shake correcting function and FIG. 6(b) is an exploded perspective view showing a state that the rigid plate 30 is separately shown.

As shown in FIGS. 3(a) and 3(b), FIGS. 4(a) and 4(b), FIGS. 5(a) and 5(b), and FIGS. 6(a) and 6(b), in the optical unit 100 in this embodiment, one end part of the flexible wiring board 420 is connected with the photographing unit 1 of the movable body 3. Therefore, in a case that the movable body 3 is to be swung, if the flexible wiring board 420 applies a large load to the movable body 3, the movable body 3 is not swung appropriately.

In order to prevent such a problem, the flexible wiring board 420 is provided with the following structure. In other words, the flexible wiring board 420 is provided with a connected part 426, which is connected with the photographing unit 1 on an inner side of the movable body 3, and an imaging element 1b is mounted on a surface on the front side in the optical axis direction "L" of the connected part 426.

Further, the flexible wiring board 420 is led out from a side face of the movable body 3 on the other side "−Y" in the "Y"-axis direction and the flexible wiring board 420 is provided with a bent part 422, which is bent toward one side "+Y" in the "Y"-axis direction along the rear end portion in the optical axis direction "L" of the movable body 3, in the vicinity of a lead-out portion 421 from the movable body 3. Further, the flexible wiring board 420 is extended toward one side "+Y" in the "Y"-axis direction from the bent part 422 and is extended out to an outer side from the fixed body 200. The flexible wiring board 420 is provided with a fixed part 424, which is fixed to the fixed body 200 with an adhesive, at a portion extended from the fixed body 200. In this embodiment, the flexible wiring board 420 is adhesively bonded on the bottom plate part 710 of the lower cover 700 of the fixed body 200 at a portion located on the one side "+Y" in the "Y"-axis direction and at a position superposed on the end part of the rectangular tube-shaped body part 210 and the bonded portion is the fixed part 424. A tip end side of the flexible wiring board 420 with respect to the fixed part 424 is an extended portion 425 from the fixed body 200 and a reinforcing plate 439 is adhesively bonded on the extended portion 425.

In the flexible wiring board 420, the bent part 422 and the fixed part 424 are located at different positions from each other in the "Z"-axis direction. More specifically, the fixed part 424 is located on one side "+Z" in the "Z"-axis direction with respect to the bent portion 422. Therefore, a portion 423 of the flexible wiring board 420 between the bent part 422 and the fixed part 424 is extended so as to obliquely intersect the optical axis direction "L". Therefore, a point of the swing support point 180 where the movable body 3 and the fixed body 200 are contacted with each other (point of the pivot 181) is located in the "Z"-axis direction between a face 422a of the bent part 422, which faces an end part on the other side "−Y" in the "Y"-axis direction of the rear end portion in the optical axis direction "L" of the movable body 3, and a face 424b of the fixed part 424 which faces the rear side in the optical axis direction "L".

The portion 423 of the flexible wiring board 420 extended toward the fixed part 424 from the bent part 422 is overlapped with the portion where the swing support point 180 is provided. Therefore, in this embodiment, the flexible wiring board 420 is provided with branched parts 423b and 423c, which are divided by a slit 423a so as to pass through on both sides of the swing support point 180, in the portion 423 between the bent part 422 and the fixed part 424 and thus, the swing support point 180 is located on an inner side of the slit 423a. In this embodiment, the slit 423a is extended to the fixed part 424 of the flexible wiring board 420. As described above, in this embodiment, the flexible wiring board 420 is formed in a relatively wide width but the branched parts 423b and 423c passing through on both sides of the swing support point 180 are formed in two strip-shaped portions whose width dimension is narrow.

In this embodiment, the movable body 3 includes a rigid plate 30 which is made of a metal plate or the like. The rigid plate 30 is joined to a rear side face in the optical axis direction "L" of the connected part 426 of the flexible wiring board 420 with the movable body 3 (connected part with the photographing unit 1) by an adhesive 48 or the like, and the rigid plate 30 structures a rear side end part in the optical axis direction "L" of the movable body 3. Therefore, the imaging element 1b is located on the front side in the optical axis direction "L" with respect to the rigid plate 30. Further, the rigid plate 30 is sandwiched between the connected part 426 connected with the photographing unit 1 and the portion 423 between the bent part 422 and the fixed part 424.

The movable body 3 is supported by the swing support point 180 through the rigid plate 30. A protruded part 38 protruded to the rear side in the optical axis direction "L" is formed at the middle of the rigid plate 30 and an end face of the protruded part 38 which is located on its rear side in the optical axis direction "L" is formed as a receiving part 182 with which the pivot 181 structuring the swing support point 180 is abutted.

In this embodiment, the bent part 422 of the flexible wiring board 420 is fixed to a face 35 on the rear side in the optical axis direction "L" of the rigid plate 30 by an adhesive 39. Further, a region 31 of the rigid plate 30 where the flexible wiring board 420 is bonded is formed as a stepped part 31c where the region 31 is protruded from its surrounding area. Specifically, a recessed part 31b is formed in a strip shape on the face 35 on the rear side in the optical axis direction "L" of the rigid plate 30 along the end part on the other side "−Y" in the "Y"-axis direction. Further, a groove-shaped opening part 37 which is extended in parallel with the recessed part 31b is formed on one side "+Y" in the "Y"-axis direction with respect to the recessed part 31b on the face 35 on the rear side in the optical axis direction "L" of the rigid plate 30. The portion sandwiched by the opening part 37 and the recessed part 31b is the region 31 where the flexible wiring board 420 is bonded. Further, the region 31 where the flexible wiring board 420 is bonded is formed with a groove 31a which is extended along a longitudinal direction ("X"-axis direction) of the region 31 in the middle in a short-side direction ("Y"-axis direction) of the region 31. The groove 31a is used as a reservoir part for the adhesive 39. Therefore, the bent part 422 of the flexible wiring board 420 is surely fixed to the face 35 of the rigid plate 30 on the rear side in the optical axis direction "L" by the adhesive 39 and thus, even when an impact is applied to the movable body 3 through the swing support point 180, the flexible wiring board 420 is prevented from being detached from the movable body 3. Further, the region 31 where the flexible wiring board 420 is bonded is structured with the stepped part 31c as a region protruded from its surrounding area. Therefore, the flexible wiring board 420 is surely bonded at a predetermined position of the rigid plate 30.

In this embodiment, both side portions 422g in a widthwise direction of the bent part 422 are formed so that their corners are cut off in an inclined shape or an "R"-shape. Therefore, corner portions of the rigid plate 30 are exposed on both side portions 422g in a widthwise direction of the bent part 422. Accordingly, in a case that the movable body 3 is swung, even when the bent part 422 of the flexible wiring board 420 is displaced together with the movable body 3, a swing range of the movable body 3 is set to be wider in comparison with a case that the corner portions of the rigid plate 30 are covered by the flexible wiring board 420.

Further, both side portions 30b in a widthwise direction of the rigid plate 30 on the end part on an opposite side to the bent part 422 are formed so that their corners are cut off in an inclined shape or an "R"-shape. Accordingly, when the movable body 3 is to be swung, a swing range of the movable body 3 is set to be wider in comparison with a case that both side portions 30b of the rigid plate 30 are formed in a rectangular shape.

Principal Effects in this Embodiment

As described above, in the optical unit 100 in this embodiment (optical unit with a shake correcting function), the movable body 3 is swingably supported by the swing support point 180 of the fixed body 200 and thus, when the shake correction drive mechanism 500 is operated, the movable body 3 is swung with the swing support point 180 as a swing center. Accordingly, even when a shake is occurred in the optical unit 100 due to a shake of hand or the like, the shake can be corrected by swinging the movable body 3.

Further, the flexible wiring board 420 is led out from the movable body 3 and the flexible wiring board 420 is provided with one bent part 422, which is bent along the rear end portion in the optical axis direction "L" of the movable body 3 in the lead-out portion 421 of the flexible wiring board 420 from the movable body 3. Therefore, different from a case that the flexible wiring board 420 is curved in a "C"-character shape, the flexible wiring board 420 is not curved largely and thus a narrow space is sufficient for disposing and extending the flexible wiring board 420 on the rear side in the optical axis direction "L" of the movable body 3.

Further, the bent part 422 is structured so that the lead-out portion 421 from the movable body 3 is bent along the rear end portion in the optical axis direction "L" of the movable body 3, and the flexible wiring board 420 is provided with the fixed part 424 which is fixed to the fixed body 200 in the extended portion from the fixed body 200 to the outer side. Therefore, the flexible wiring board 420 is capable of being displaced only in the portion from the bent part 422 to the fixed part 424. However, in this embodiment, in the "Z"-axis direction (direction of the optical axis), a point of the swing support point 180 (point of the pivot 181) where the movable body 3 and the fixed body 200 are contacted with each other is located between the face 422*a* of the bent part 422, which faces the end part on the other side "−Y" in the "Y"-axis direction of the rear end portion in the optical axis direction "L" of the movable body 3 and the face 424*b* which faces the rear side in the optical axis direction "L" of the fixed part 424. Therefore, even when the movable body 3 is swung, displacement of the flexible wiring board 420 is small. Accordingly, when the movable body 3 is swung, since a load which is applied to the movable body 3 by the flexible wiring board 420 is small, the movable body 3 is swung appropriately.

Further, although the flexible wiring board 420 is formed so as to have a considerably wider width, the branched parts 423*b* and 423*c* which are passed through on both sides of the swing support point 180 are formed to be two strip-shaped portions whose width dimension is narrow. Therefore, when the flexible wiring board 420 is displaced, since a load which is applied to the movable body 3 by the flexible wiring board 420 is small, the movable body 3 is swung appropriately.

In addition, the movable body 3 is provided with the rigid plate 30 on the rear end portion in the optical axis direction "L", and the rigid plate 30 is supported by the fixed body 200 through the swing support point 180. Therefore, even when an impact is applied to the movable body 3 through the swing support point 180, the movable body 3 is prevented from being damaged. Further, the imaging element 1*b* is provided on the front side in the optical axis direction "L" with respect to the rigid plate 30 and thus, even when an impact is applied to the movable body 3 through the swing support point 180, the imaging element 1*b* can be protected.

Second Embodiment

Figure 7:
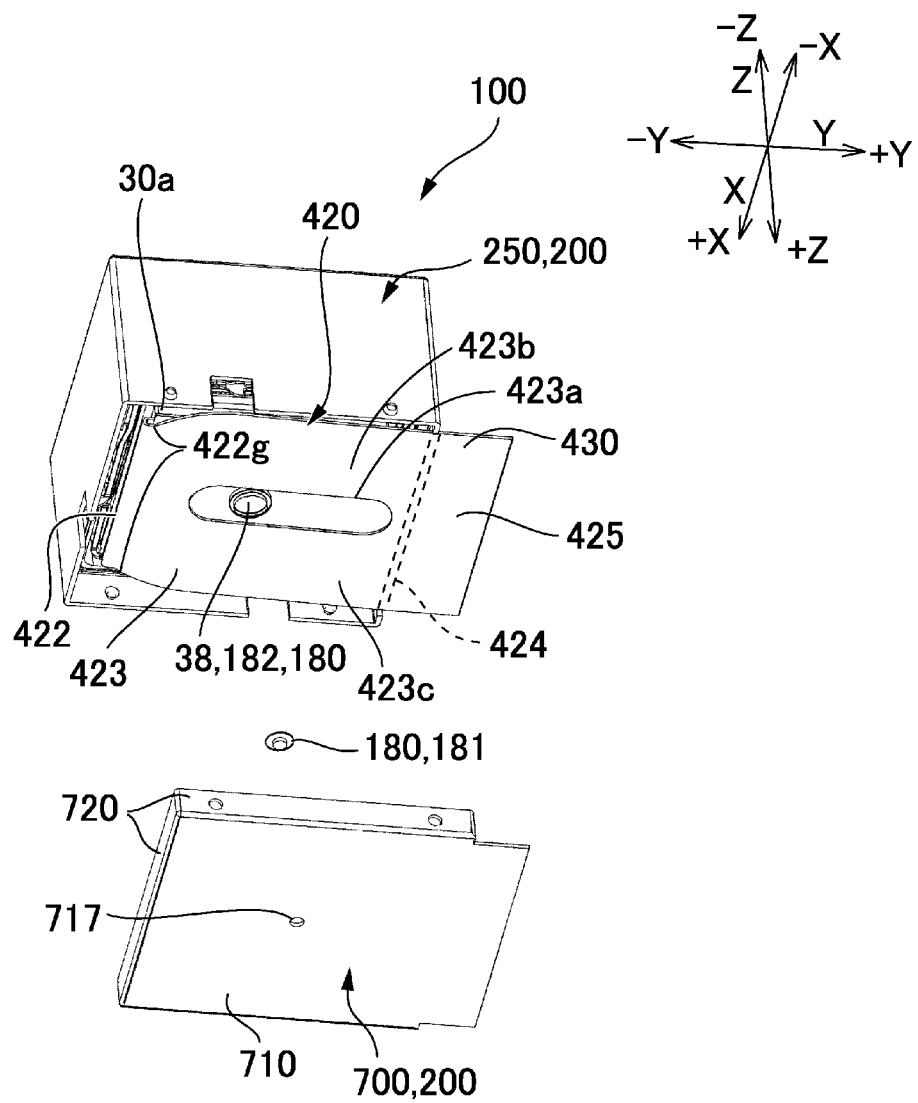
FIG. 7 is an exploded perspective view showing a state that a lower cover is detached from an optical unit with a shake correcting function in accordance with a second embodiment of the present invention which is viewed from a rear side in an optical axis direction.

FIG. 7 is an exploded perspective view showing a state that a lower cover 700 is detached from an optical unit 100 with a shake correcting function in accordance with a second embodiment of the present invention which is viewed from a rear side in an optical axis direction. Basic structures in the second embodiment is similar to the first embodiment and thus, the same reference signs are used in the common portions and their descriptions are omitted.

In the first embodiment, as described with reference to FIGS. 6(*a*) and 6(*b*), the slit 423*a* for forming the branched parts 423*b* and 423*c* is extended to the fixed part 424 of the flexible wiring board 420. However, in the second embodiment, as shown in FIG. 7, the slit 423*a* and the branched parts 423*b* and 423*c* are ended before the fixed part 424 viewing from a side where the swing support point 180 is located. According to this structure, different from a case that the branched parts 423*b* and 423*c* are utilized as the fixed part, a difference of the length dimensions of the branched parts 423*b* and 423*c* does not occur. Therefore, the branched parts 423*b* and 423*c* do not apply a useless load to the movable body 3.

Third Embodiment

Figure 8A:
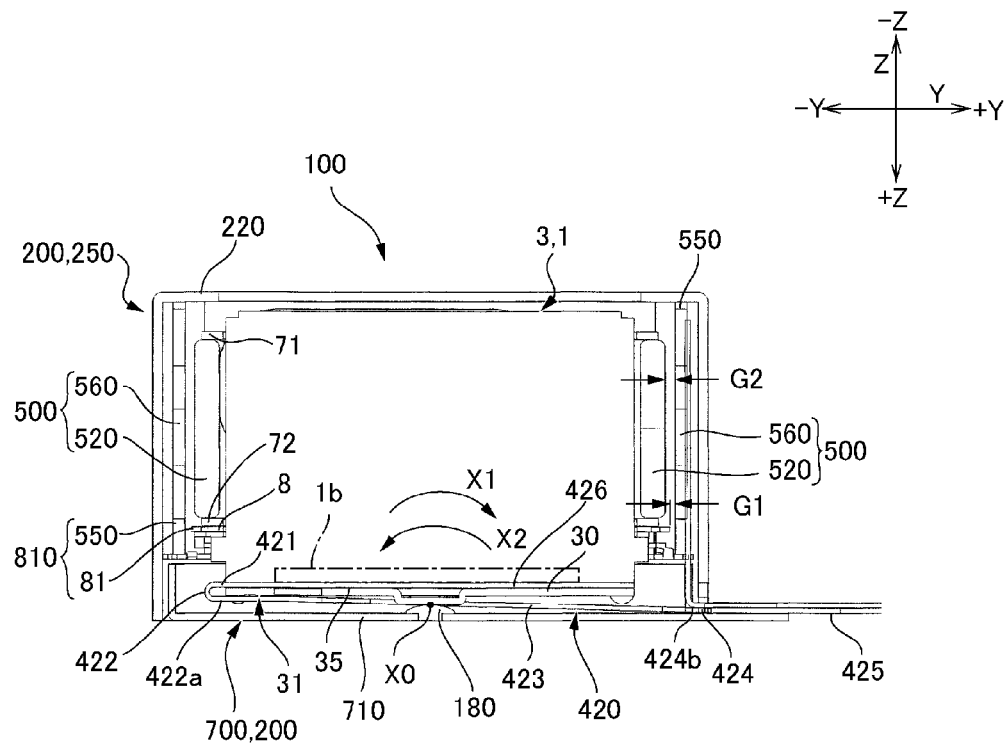
FIGS. 8(a) and 8(b) are cross-sectional views showing an optical unit with a shake correcting function in accordance with a third embodiment of the present invention.
Figure 8B:
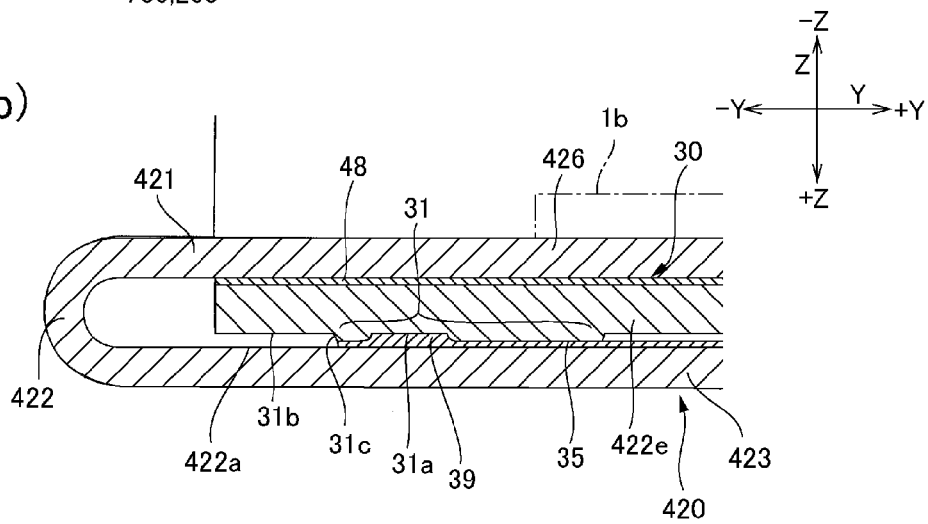

FIGS. 8(*a*) and 8(*b*) are cross-sectional views showing an optical unit 100 with a shake correcting function in accordance with a third embodiment of the present invention. FIG. 8(*a*) is a "YZ" cross-sectional view showing an optical unit 100 and FIG. 8(*b*) is an enlarged cross-sectional view showing a bent portion of a flexible wiring board 420. Basic structures in the third embodiment is similar to the first embodiment and thus, the same reference signs are used in the common portions and their descriptions are omitted.

In the first embodiment, a portion between the opening part 37 and the recessed part 31*b* of the face 35 on the rear side in the optical axis direction "L" of the rigid plate 30 is set to be a region 31 where the flexible wiring board 420 is bonded. However, in the third embodiment, as shown in FIGS. 8(*a*) and 8(*b*), a recessed part 422*e* is formed instead of the opening part 37. Also in this structure, a region 31 where the flexible wiring board 420 is bonded is formed by a stepped part 31*c* for protruding the region 31 from the surrounding area and thus the flexible wiring board 420 can be surely bonded to a predetermined position of the rigid plate 30.

Fourth Embodiment

Figure 9A:
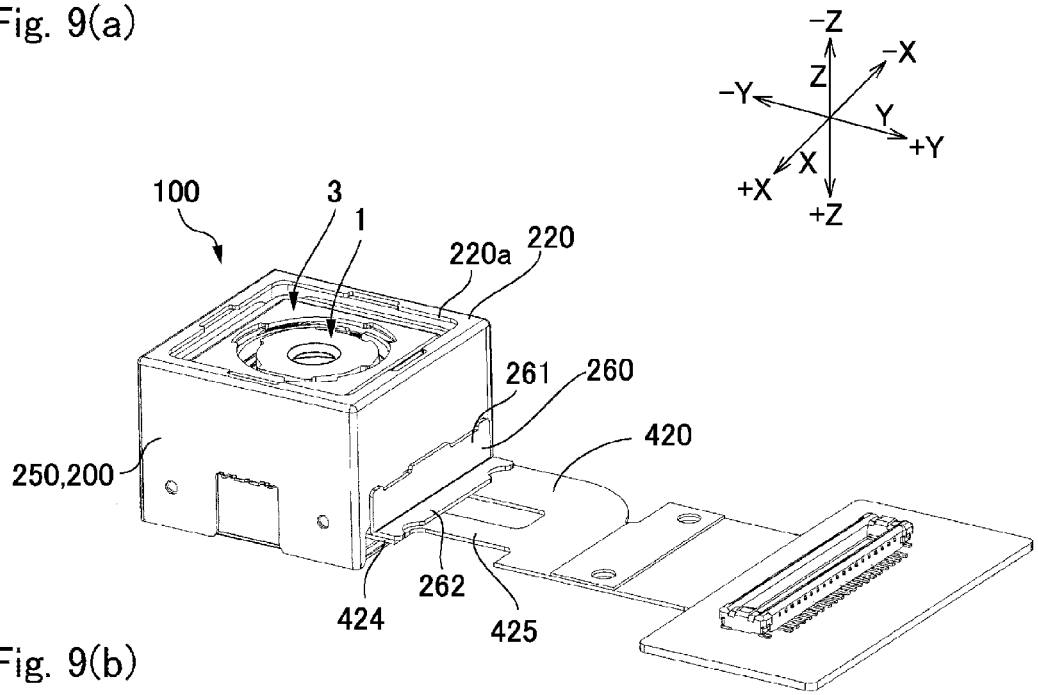
FIGS. 9(a) and 9(b) are explanatory views showing an optical unit with a shake correcting function in accordance with a fourth embodiment of the present invention.
Figure 9B:
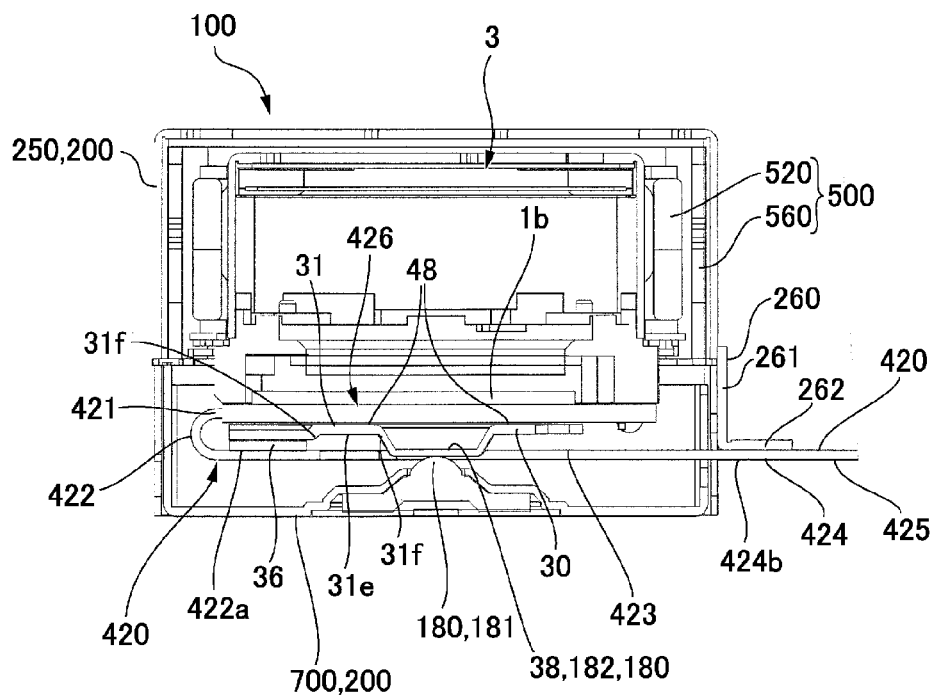
Figure 10A:
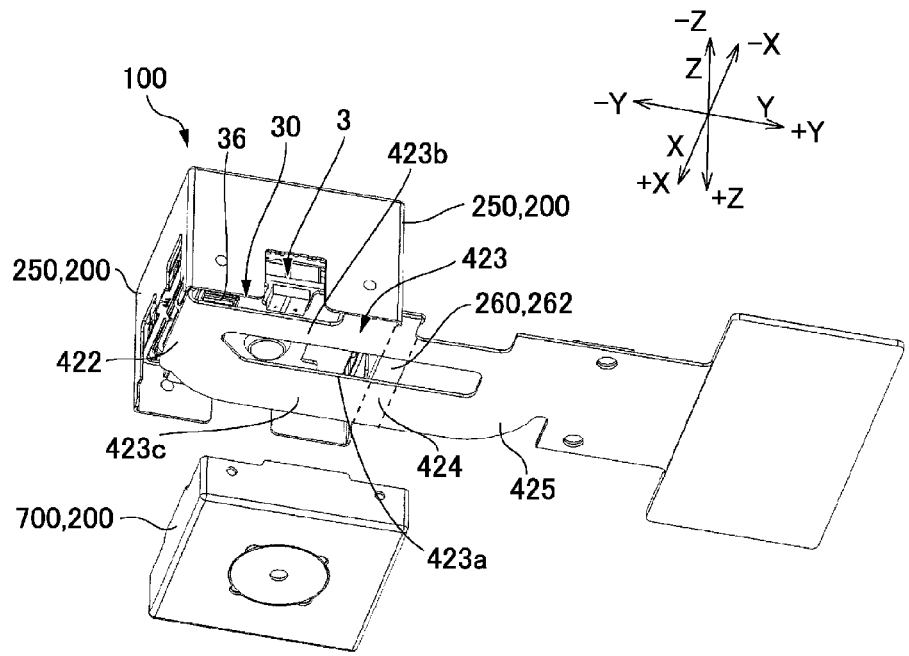
FIGS. 10(a), 10(b) and 10(c) are explanatory views showing an optical unit with a shake correcting function in accordance with a fourth embodiment of the present invention which is viewed from a rear side in an optical axis direction.
Figure 10B:
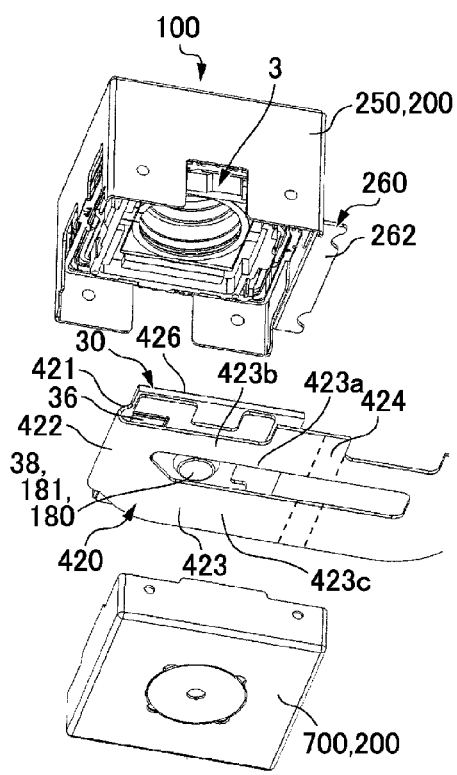
Figure 10C:
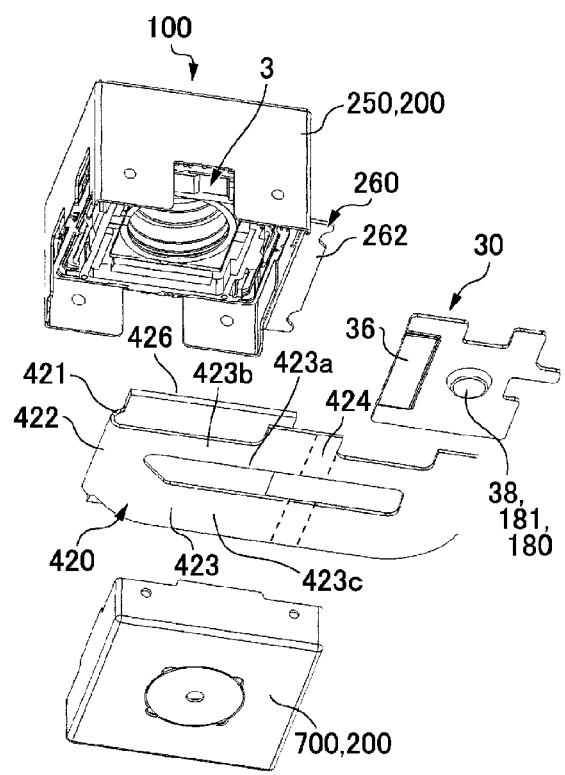

FIGS. 9(*a*) and 9(*b*) are explanatory views showing an optical unit 100 with a shake correcting function in accordance with a fourth embodiment of the present invention. FIG. 9(*a*) is its perspective view and FIG. 9(*b*) is its cross-sectional view. FIGS. 10(*a*), 10(*b*) and 10(*c*) are explanatory views showing the optical unit 100 with a shake correcting function in accordance with the fourth embodiment of the present invention which is viewed from a rear side in an optical axis direction. FIG. 10(*a*) is an exploded perspective view showing a state that a lower cover 700 is detached from an optical unit 100 and which is viewed from a rear side in an optical axis direction "L", FIG. 10(*b*) is an exploded perspective view showing a state that a flexible wiring board 420 is detached from a movable body and which is viewed from a rear side in an optical axis direction "L", and FIG. 10(*c*) is an exploded perspective view showing a state that a rigid plate 30 is detached from the flexible wiring board 420 and which is viewed from the rear side in the optical axis direction "L". Basic structures in the fourth embodiment is similar to the first embodiment and thus, the same reference signs are used in the common portions and their descriptions are omitted.

At least an embodiment of the present invention may be applied to an optical unit 100 with a shake correcting function which is shown in FIGS. 9(*a*) and 9(*b*), and FIGS. 10(*a*), 10(*b*) and 10(*c*). Even in the optical unit 100 with a shake correcting function shown in FIGS. 9(*a*) and 9(*b*), and FIGS. 10(*a*), 10(*b*) and 10(*c*), similarly to the first embodiment, one end part of the flexible wiring board 420 is connected with the photographing unit 1 of the movable body 3. The flexible wiring board 420 is provided with a connected part 426 connected with the photographing unit 1 on an inner side of the movable body 3 and an imaging element 1*b* is mounted on a face on a front side in the optical axis direction "L" of the connected part 426. In this embodiment, the connected part 426 is formed in a structure that a metal plate is adhesively fixed to an end part of the flexible wiring board 420 to increase rigidity.

Further, the flexible wiring board 420 is extended from a side face of the movable body 3 on the other side "−Y" in the "Y"-axis direction, and the flexible wiring board 420 is provided with a bent part 422 which is bent toward one side "+Y" in the "Y"-axis direction along a rear end portion in the optical axis direction "L" of the movable body 3 in a lead-out portion 421 of the flexible wiring board 420 from the movable body 3. Further, the flexible wiring board 420 is extended from the bent part 422 toward one side "+Y" in the "Y"-axis direction and then extended from the fixed body 200 to the outer side.

In this embodiment, a vertical plate part 261 of a support plate 260 in an "L"-character shape is fixed to a side face of the fixed body 200 on one side "+Y" in the "Y"-axis direction and a fixed part 424 of the flexible wiring board 420 is fixed to a horizontal plate part 262 of the support plate 260 with an adhesive or the like. Therefore, in the flexible wiring board 420, the bent part 422 and the fixed part 424 are located at the same position in the "Z"-axis direction. Accordingly, the portion 423 between the bent part 422 and the fixed part 424 of the flexible wiring board 420 is extended so as to be perpendicular to the optical axis.

Even in the flexible wiring board 420 structured as described above, similarly to the first embodiment, a position of the swing support point 180 where the movable body 3 and the fixed body 200 are contacted with each other (position of the pivot 181) is located between the face 422*a* of the bent part 422, which faces the end part on the other side "−Y" in the "Y"-axis direction in the rear end portion in the optical axis direction "L" of the movable body 3, and the face 424*b* of the fixed part 424 which faces the rear side in the optical axis direction "L" in the "Z"-axis direction.

The portion 423 of the flexible wiring board 420 which is extended from the bent part 422 toward the fixed part 424 is overlapped with the portion where the swing support point 180 is provided. Therefore, in this embodiment, the portion 423 of the flexible wiring board 420 between the bent part 422 and the fixed part 424 is provided with the branched parts 423*b* and 423*c* in a strip shape, which are divided so as to pass through on both sides of the swing support point 180 by the slit 423*a*, and the swing support point 180 is located on an inner side of the slit 423*a*. In this embodiment, the slit 423*a* is extended to a tip end side with respect to the fixed part 424 of the flexible wiring board 420 to reach to a midway position of the extended portion 425 from the fixed body 200 to the outer side.

The movable body 3 includes a rigid plate 30. The rigid plate 30 is joined with a face of the connected part 426 of the flexible wiring board 420 on a rear side in the optical axis direction "L" with an adhesive 48 or the like, and the rigid plate 30 structures a rear side end part in the optical axis direction "L" of the movable body 3. Therefore, an imaging element 1*b* is located on a front side in the optical axis direction "L" with respect to the rigid plate 30. Further, the movable body 3 is supported by the swing support point 180 through the rigid plate 30. A protruded part 38 which is protruded to a rear side in the optical axis direction "L" is formed in the middle of the rigid plate 30. An end face of the protruded part 38 which is located on a rear side in the optical axis direction "L" is formed as a receiving part 182 with which the pivot 181 structuring the swing support point 180 is abutted.

In this embodiment, the bent part 422 of the flexible wiring board 420 is fixed to the face 35 of the rigid plate 30 on the rear side in the optical axis direction "L" through a flexible adhesive sheet 36. Further, a region 31 of the rigid plate 30 where the flexible wiring board 420 is bonded is formed through a stepped part 31*f* where the region 31 is protruded from its surrounding area. Specifically, the face 35 of the rigid plate 30 on the rear side in the optical axis direction "L" is formed with a groove-shaped recessed part 31*e* which is extended in parallel with an end part of the rigid plate 30 on the other side "−Y" in the "Y"-axis direction. Therefore, the region 31 where the flexible wiring board 420 is fixed is structured through the stepped part 31*f* as a region protruded from its surrounding area. Accordingly, the flexible wiring board 420 is surely fixed to a predetermined position of the rigid plate 30.

Other Embodiments

In the embodiments described above, the present invention is, as an example, applied to the optical unit 100 which is used in a cell phone with a camera. However, at least an embodiment of the present invention may be applied to the optical unit 100 which is used in a thin digital camera or the like. Further, in the embodiment described above, a lens drive mechanism and the like are structured in the photographing unit 1. However, at least an embodiment of the present invention may be applied to a fixed focus type optical unit in which the lens drive mechanism is not mounted on the photographing unit 1.

In the embodiments described above, the pivot 181 of the swing support point 180 is structured in the fixed body 200. However, the pivot 181 of the swing support point 180 may be formed in the movable body 3.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
   a movable body which holds an optical element;
   a fixed body which covers the movable body;
   a flexible wiring board which is extended from the movable body to an outer side with respect to the fixed body;
   a swing support point which is provided between a rear end portion in an optical axis direction of the movable body and the fixed body; and
   a shake correction drive mechanism which swings the movable body with the swing support point as a swing center;
   wherein the flexible wiring board is provided with a bent part, which is bent along the rear end portion in the optical axis direction of the movable body in a lead-out portion from the movable body, and a fixed part which is fixed to the fixed body in an extended portion from the fixed body to the outer side; and
   wherein the swing support point is located in the optical axis direction between a face of the bent part facing the rear end portion in the optical axis direction of the movable body and a face of the fixed part which faces a rear side in the optical axis direction;
   wherein the movable body comprise a rigid plate on the rear end portion in the optical axis direction;
   the rigid plate is supported by the fixed body through the swing support point; and
   the bent part is fixed to a face of the rigid plate on a rear side in the optical axis direction with an adhesive;
   wherein the flexible wiring board is bent only through the bent part between a connected part with the movable body and the fixed part;
   the flexible wiring board is provided with only one bent part;
   a portion between the bent part and the fixed part is extended so as to obliquely intersect the optical axis direction;
   the flexible wiring board is displaceable for the swing of the movable body in the portion between the bent part and the fixed part; and
   the swing support point is located between the bent part and the fixed part.

2. The optical unit with a shake correcting function according to claim 1, wherein the flexible wiring board is provided between the bent part and the fixed part with branched parts which are divided so as to pass through on both sides of the swing support point, and
   the branched parts on a bent part side with respect to the fixed part are capable of being displaced for swing of the movable body.

3. The optical unit with a shake correcting function according to claim 2, wherein the branched parts are ended before the fixed part viewed from a side where the swing support point is located.

4. The optical unit with a shake correcting function according to claim 1, wherein an imaging element is provided on a front side with respect to the rigid plate in the optical axis direction.

5. The optical unit with a shake correcting function according to claim 1, wherein
   a region of the rigid plate where the flexible wiring board is bonded is formed by a stepped part which is protruded from a surrounding area, and
   the region is formed with a groove-shaped recessed part.

6. The optical unit with a shake correcting function according to claim 1, wherein
   corner portions on both sides in a widthwise direction of the bent part are formed to be cut off in an inclined shape or an "R"-shape, and
corner portions on both sides in a widthwise direction of an end part of the rigid plate on an opposite side to the bent part are formed to be cut off in an inclined shape or an "R"-shape.

7. The optical unit with a shake correcting function according to claim 2, wherein
   the movable body comprises a rigid plate on the rear end portion in the optical axis direction, and
   the rigid plate is supported by the fixed body through the swing support point.

8. The optical unit with a shake correcting function according to claim 2, wherein
   the movable body comprises a rigid plate on the rear end portion in the optical axis direction, and the bent part of the flexible wiring board is formed so that the lead-out portion of the flexible wiring board from the movable body is bent and fixed to a face on a rear side in the optical axis direction of the rigid plate.

9. The optical unit with a shake correcting function according to claim 2, wherein
the movable body comprises a rigid plate on the rear end portion in the optical axis direction, and
the rigid plate is supported by the fixed body through the swing support point.

10. The optical unit with a shake correcting function according to claim 2, wherein
the movable body comprises a rigid plate on the rear end portion in the optical axis direction, and
the bent part of the flexible wiring board is formed so that the lead-out portion of the flexible wiring board from the movable body is bent and fixed to a face on a rear side in the optical axis direction of the rigid plate.

* * * * *